(12) United States Patent
Fritz

(10) Patent No.: US 11,545,701 B2
(45) Date of Patent: Jan. 3, 2023

(54) TRACTION BATTERY OF A MOTOR VEHICLE

(71) Applicant: Dr. Ing. h.c. F. Porsche Aktiengesellschaft, Stuttgart (DE)

(72) Inventor: Thomas Fritz, Löchgau (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 210 days.

(21) Appl. No.: 17/095,847

(22) Filed: Nov. 12, 2020

(65) Prior Publication Data

US 2021/0242507 A1 Aug. 5, 2021

(30) Foreign Application Priority Data

Feb. 3, 2020 (DE) ...................... 10 2020 102 561.0

(51) Int. Cl.
*H01M 10/42* (2006.01)
*H01M 50/20* (2021.01)
*H01M 50/204* (2021.01)

(52) U.S. Cl.
CPC ....... *H01M 10/4228* (2013.01); *H01M 50/20* (2021.01); *H01M 50/204* (2021.01); *H01M 2220/20* (2013.01)

(58) Field of Classification Search
CPC .................................................. H01M 10/48
See application file for complete search history.

(56) References Cited

U.S. PATENT DOCUMENTS

| 8,695,740 B1* | 4/2014 | Boddakayala .... | H01M 10/6561 |
| | | | 429/61 |
| 9,616,754 B2 | 4/2017 | Yang | |
| 10,293,747 B2 | 5/2019 | Mohr et al. | |
| 2013/0055890 A1* | 3/2013 | Lim ...................... | B01D 46/46 |
| | | | 180/65.21 |
| 2015/0280184 A1* | 10/2015 | Utley .................. | H01M 50/289 |
| | | | 429/99 |
| 2016/0042630 A1* | 2/2016 | Cho ...................... | G08B 21/18 |
| | | | 340/517 |
| 2019/0173139 A1* | 6/2019 | Kellner ............... | H01M 50/271 |

FOREIGN PATENT DOCUMENTS

| CN | 208706741 U | 4/2019 |
| DE | 102013224745 A1 | 6/2015 |
| DE | 102018123230 A1 | 3/2019 |
| EP | 2289720 A1 | 3/2011 |

* cited by examiner

*Primary Examiner* — Ula C Ruddock
(74) *Attorney, Agent, or Firm* — RatnerPrestia

(57) ABSTRACT

A traction battery of a motor vehicle includes a battery housing, and a plurality of battery modules which are arranged in the battery housing. Each battery module has a module housing and battery cells which are accommodated in the respective module housing. At least one particle sensor and/or at least one gas sensor are/is arranged in the battery housing.

13 Claims, 2 Drawing Sheets

TRACTION BATTERY OF A MOTOR VEHICLE

CROSS-REFERENCE TO RELATED APPLICATION

Figure 1:
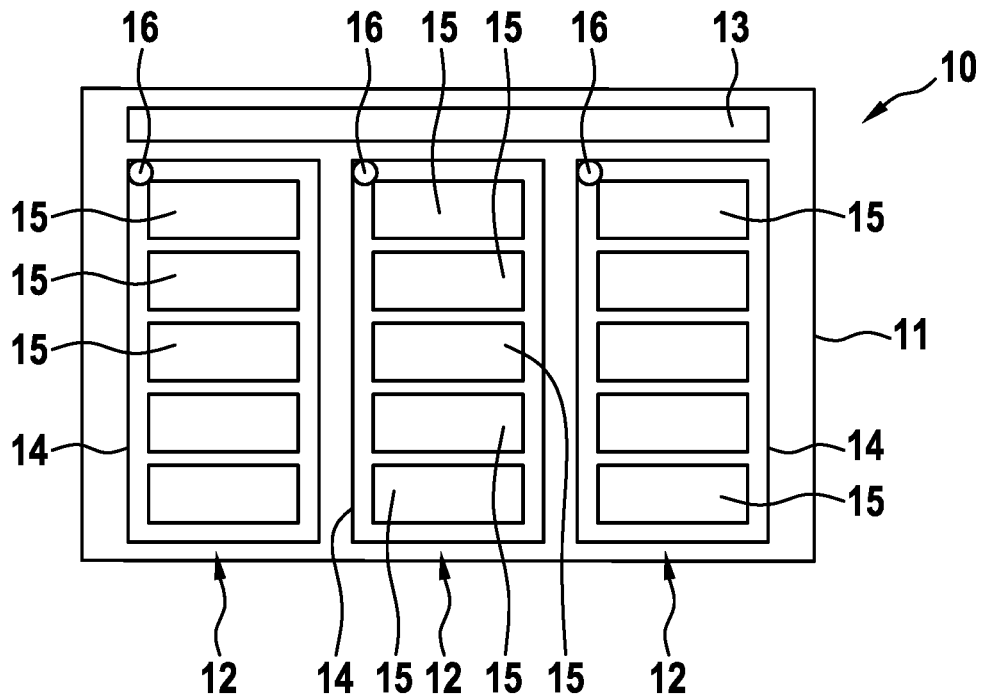

This application claims priority to German Patent Application No. 10 2020 102 561.0, filed Feb. 3, 2020, the content of such application being incorporated by reference herein in its entirety.

FIELD OF THE INVENTION

The invention relates to a traction battery of a motor vehicle.

BACKGROUND OF THE INVENTION

A traction battery of a motor vehicle, which is designed as an electric vehicle or hybrid vehicle, has a battery housing in which a plurality of battery modules are accommodated. Each battery module has a module housing with battery cells which are accommodated in the respective module housing.

DE 10 2018 123 230 A1, which is incorporated by reference herein, discloses a vehicle comprising a battery, wherein a venting pipe, which is coupled to the battery, lets gas out of the battery outside a vehicle cabin. A gas flow sensor is arranged in the venting pipe in order to measure a flow rate through the venting pipe.

EP 2 289 720 B1, which is incorporated by reference herein, discloses an electric vehicle comprising a battery, wherein a gas sensor and/or a gas temperature sensor are/is provided outside the battery in a chamber of the vehicle, which chamber covers an upper section of the battery. Said chamber is connected to a gas outlet duct.

U.S. Pat. No. 9,616,754 B2, which is incorporated by reference herein, discloses an apparatus and a method for protecting passengers of a motor vehicle from effects of battery damage, wherein a gas sensor is arranged outside the battery in a battery duct in which the battery is installed.

DE 10 2013 224 745 A1, which is incorporated by reference herein, discloses a motor vehicle comprising a battery chamber in which a battery is arranged. A battery gas detector, which is designed to detect formation of battery gas in the battery chamber, is provided inside the battery chamber and outside the battery.

SUMMARY OF THE INVENTION

Described herein is a battery in a motor vehicle, wherein a gas sensor can be arranged outside the battery in a chamber which accommodates the battery. Said gas sensor can be used to detect whether battery gases are escaping from the battery. This serves for checking the functioning of the battery.

There exists a need for a traction battery of a motor vehicle, which traction battery can be subjected to a detailed functional check. Thus, it would be desirable to provide a novel traction battery of a motor vehicle.

The traction battery according to aspects of the invention has at least one particle sensor and/or at least one gas sensor which are/is arranged in the battery housing. The invention proposes arranging at least one particle sensor and/or at least one gas sensor in the battery housing of the traction battery, which battery housing accommodates a plurality of battery modules comprising battery cells which are arranged in the module housings of the battery modules. In this case, it is possible to arrange the respective sensor directly in the battery housing or indirectly in a respective module housing which is accommodated in the battery housing. As a result, a traction battery can be subjected to a more extensive functional check than is possible according to the prior art.

According to one advantageous development, the at least one particle sensor and/or at least one gas sensor are/is arranged in a respective module housing of a battery module which is arranged in the battery housing. When the respective sensor is arranged in the respective module housing, it is particularly advantageously possible to check whether individual battery modules of the traction battery according to aspects of the invention are in order, specifically the module housings of said battery modules are tight to the ingress of contaminants from outside the module housing to inside the module housing and/or whether the individual battery cells of the respective battery module are outgassing.

According to one advantageous development, the respective particle sensor detects the ingress of contaminants from outside the battery housing into an interior of the battery housing. The respective particle sensor is preferably arranged directly in the battery housing in order to check whether contaminants are entering the interior of the battery housing from outside the battery housing.

According to one advantageous development, the respective gas sensor detects outgassing of battery cells into an interior of the respective module housing. The respective gas sensor is preferably arranged in the module housing of the respective battery module. Therefore, it is possible to check each battery module individually as to whether the battery cells of said battery module are outgassing.

The respective gas sensor is preferably a VOC sensor for volatile organic compounds. The respective particle sensor is preferably a fine-dust sensor. A VOC sensor is particularly suitable for sensing slight outgassing of the battery cells over the course of normal aging of said battery cells. A fine-dust sensor is particularly preferred for checking whether impurities are entering the battery housing from outside said battery housing.

According to one advantageous development, the traction battery according to aspects of the invention has at least one temperature sensor and/or pressure sensor which are/is arranged in the battery housing. There is preferably a control device which draws conclusions about leaktightness or non-leaktightness of the battery housing depending on a measurement signal of the particle sensor and depending on a measurement signal of the temperature sensor and/or pressure sensor. The leaktightness or non-leaktightness of the battery housing is preferably checked by way of the signal of the particle sensor being evaluated in combination with a signal of the temperature sensor and/or pressure sensor which are/is preferably arranged directly in the battery housing together with the particle sensor.

BRIEF DESCRIPTION OF THE DRAWING FIGURES

Figure 2:
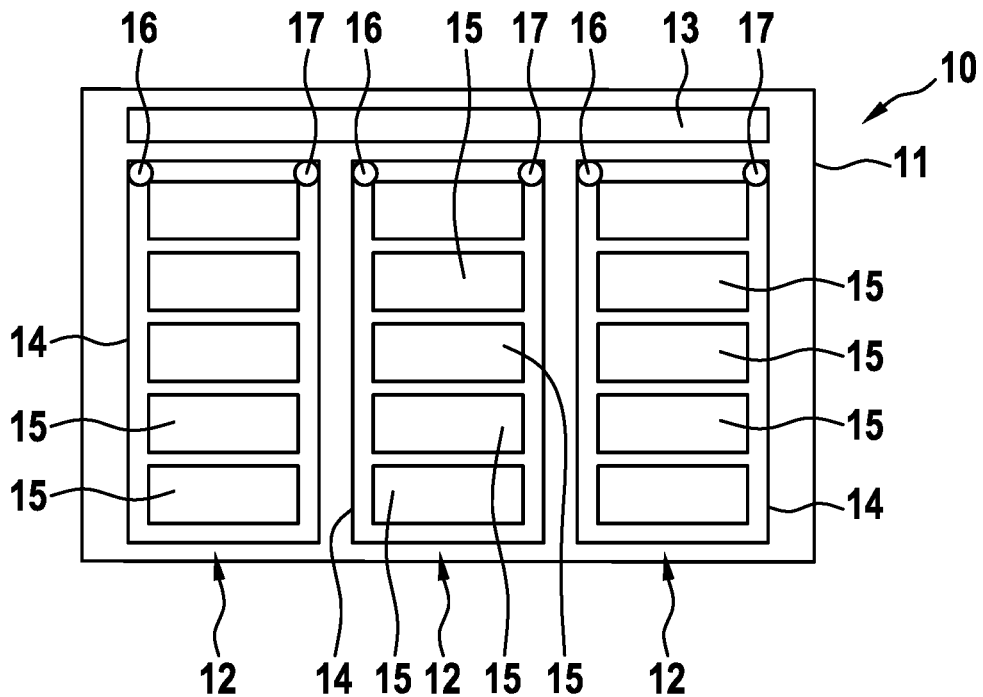
Figure 3:
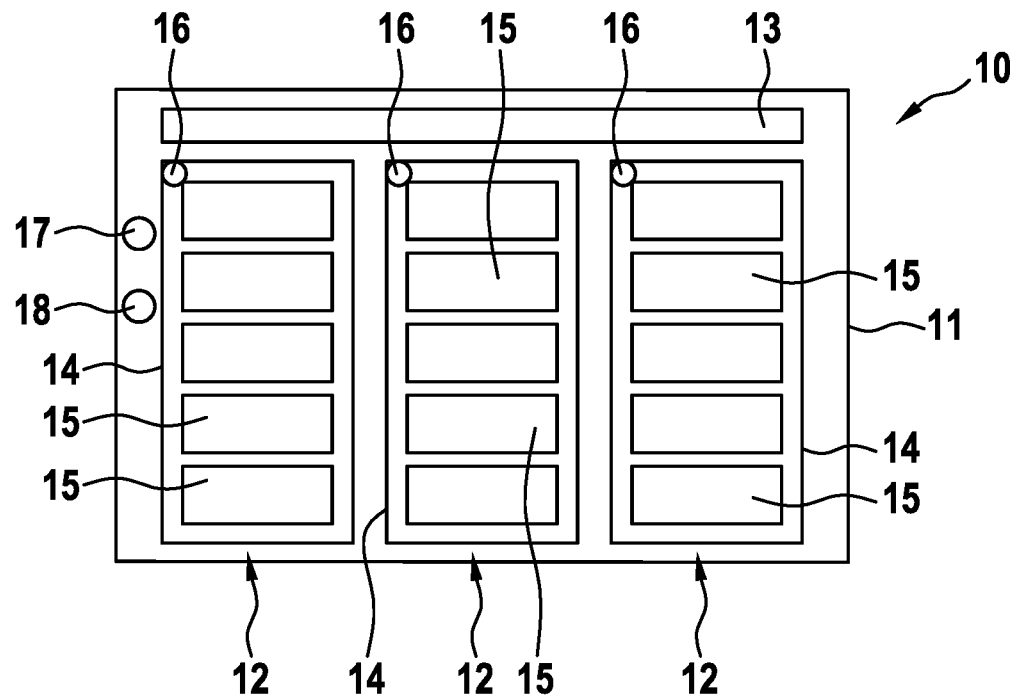

Preferred developments of the invention can be found in the dependent claims and the following description. Exemplary embodiments of the invention are explained in more detail with reference to the drawing, without the invention being restricted to said exemplary embodiments. In the drawing:

FIG. 1 shows a schematic illustration of a first traction battery according to aspects of the invention of a motor vehicle, FIG. 2 shows a schematic illustration of a second traction battery according to aspects of the invention of a motor vehicle, FIG. 3 shows a schematic illustration of a further traction battery according to aspects of the invention of a motor vehicle.

DETAILED DESCRIPTION OF THE INVENTION

FIG. 1 shows a schematic illustration of a traction battery 10 of a motor vehicle which is designed as an electric vehicle or hybrid vehicle.

The traction battery 10 has a battery housing 11. A plurality of battery modules 12 and a controller 13 are accommodated in the battery housing 11. The controller 13 can also be arranged outside the battery housing 11. Each battery module 12 has a module housing 14 and a plurality of battery cells 15 which are accommodated in the respective module housing 14.

In the exemplary embodiment shown in FIG. 1, a gas sensor 16 is arranged in each module housing 14 of each battery module 12 in addition to the battery cells 15. When one or more of the battery cells 15 of a respective battery module 14 outgas as a result of aging and gas enters the interior of the module housing 14 of the respective battery module 12 from a respective battery cell 15, this can be metrologically sensed with the aid of the respective gas sensor 16 in order to in this way draw conclusions about aging or else a defect in the respective battery module 14 individually for the respective battery module 14 of the traction battery 10. The signals which are provided by the respective gas sensor 16 can be evaluated in a corresponding manner by the controller 13.

FIG. 2 shows a further exemplary embodiment of a traction battery 10 according to aspects of the invention, in which traction battery not only a gas sensor 16 but also a particle sensor 17 are arranged in the module housing 14 of each battery module 12.

The particle sensor 17 can be used to sense whether contaminants are entering the interior of the respective module housing 14 from outside the respective module housing 14, that is to say from the interior of the battery housing 10. In this way, the leaktightness of the respective module housing 14 of the respective battery module 12 can be checked.

FIG. 3 shows a development of the traction battery 10 of FIG. 1, in which traction battery a gas sensor 16 is arranged in each module housing 14 of each battery module 12, wherein a particle sensor 17 is arranged in the battery housing 11, that is to say directly in the battery housing 11 as such and not indirectly in the module housing 14 which is arranged in the battery housing 11, in FIG. 3. Therefore, it is possible to check whether the battery housing 11 is leaktight, that is to say whether contaminants are entering the interior of the battery housing 11 from outside said battery housing. In addition, a temperature sensor 18 is arranged in the battery housing 11 in the exemplary embodiment of FIG. 3. In addition or as an alternative to the temperature sensor 18, a pressure sensor together with the particle sensor 17 can also be arranged in the battery housing 11. The signal of the particle sensor 17 is preferably evaluated in combination with the signal of the temperature sensor 18 and/or pressure sensor by the control device 13 in order to draw conclusions about leaktightness or non-leaktightness of the battery housing 11.

A large number of modifications to the exemplary embodiments shown in FIGS. 1 to 3 are conceivable. For example, a gas sensor 16 can be arranged directly in the battery housing 11 in order to jointly check for all battery modules 12 whether gas is escaping from the battery modules 12 as a result of non-leaktightness of the battery cells 15.

It is also possible to arrange a temperature sensor and/or pressure sensor together with a particle sensor 17 inside each module housing 14 of each battery module 12.

The variant embodiment of FIG. 3 is preferred. Here, the outgassing of the respective battery cells 15 can be monitored individually for each battery module 12. It is possible to check whether contaminants which can then migrate via the module housings 14 into the interior of the respective battery modules 12 are entering the interior of the battery housing 11 from outside said battery housing for all battery modules 12 jointly and accordingly for the battery housing 11.

The respective gas sensor 16 is preferably a VOC sensor for volatile organic compounds.

The respective particle sensor 17 is preferably a fine-dust sensor.

What is claimed:

1. A traction battery of a motor vehicle, said traction battery comprising:
   a leak-tight battery housing,
   a plurality of battery modules arranged in the battery housing, wherein each battery module has a leak-tight module housing and battery cells which are accommodated in the respective module housing,
   at least one particle sensor arranged outside of the module housings and inside of the battery housing, wherein the particle sensor detects ingress of contaminants entering from outside of the leak-tight battery housing and into an interior of the battery housing,
   at least one gas sensor arranged inside the module housing of one of the battery modules, wherein the gas sensor detects outgassing of the battery cells of said one of the battery modules into an interior of the respective leak-tight module housing.

2. The traction battery as claimed in claim 1, wherein the respective particle sensor and/or gas sensor are/is arranged in a respective module housing of a battery module which is arranged in the battery housing.

3. The traction battery as claimed in claim 1, wherein the respective particle sensor also detects ingress of contaminants into an interior of the respective module housing.

4. The traction battery as claimed in claim 1, wherein the respective gas sensor detects outgassing of battery cells into the interior of the battery housing.

5. The traction battery as claimed in claim 1, wherein the respective gas sensor is a VOC sensor for volatile organic compounds.

6. The traction battery as claimed in claim 1, wherein the respective particle sensor is a fine-dust sensor.

7. The traction battery as claimed in claim 1, further comprising at least one temperature sensor and/or one pressure sensor arranged in the battery housing.

8. The traction battery as claimed in claim 7, wherein a control device which analyzes leaktightness or non-leaktightness of the module housing and/or of the battery housing depending on a measurement signal of the respective particle sensor and/or of the gas sensor and depending on a measurement signal of the temperature sensor and/or pressure sensor.

9. The traction battery as claimed in claim 1, further comprising a controller arranged outside of the module housings and inside of the battery housing, the controller being connected to receive signals from the at least one particle sensor and the gas sensor.

10. The traction battery as claimed in claim 1, wherein each battery module includes at least one of the gas sensors.

11. The traction battery as claimed in claim 1, further comprising at least one temperature sensor and/or one pressure sensor arranged in the battery housing and outside of the battery module housings.

12. The traction battery as claimed in claim 1, wherein the at least one gas sensor is located outside of the battery cells of said one of the battery modules.

13. The traction battery as claimed in claim 1, further comprising another particle sensor arranged inside one of the module housings, wherein the particle sensor detects ingress of contaminants entering into said one of the module housings.

* * * * *